US012250760B2

(12) United States Patent
Ha et al.

(10) Patent No.: US 12,250,760 B2
(45) Date of Patent: Mar. 11, 2025

(54) OVEN INCLUDING PLURAL ANTENNAS

(71) Applicant: LG Electronics Inc., Seoul (KR)

(72) Inventors: Junghyeong Ha, Seoul (KR); Sunghun Sim, Seoul (KR); Yunbyung Chae, Seoul (KR); Chaehyun Baek, Seoul (KR)

(73) Assignee: LG Electronics Inc., Seoul (KR)

( * ) Notice: Subject to any disclaimer, the term of this patent is extended or adjusted under 35 U.S.C. 154(b) by 444 days.

(21) Appl. No.: 17/115,088

(22) Filed: Dec. 8, 2020

(65) Prior Publication Data

US 2021/0352779 A1 Nov. 11, 2021

(30) Foreign Application Priority Data

May 8, 2020 (KR) ........................ 10-2020-0055373

(51) Int. Cl.
*H05B 6/72* (2006.01)
*H05B 6/64* (2006.01)

(52) U.S. Cl.
CPC ............. *H05B 6/72* (2013.01); *H05B 6/6402* (2013.01); *H05B 6/642* (2013.01)

(58) Field of Classification Search
CPC ........ H05B 6/72; H05B 6/6402; H05B 6/642; H05B 6/6482; H05B 6/647
See application file for complete search history.

(56) References Cited

U.S. PATENT DOCUMENTS 9,967,925 B2 5/2018 Yishai et al.
2008/0128409 A1* 6/2008 Froelicher ............ H05B 6/6411 219/680
2009/0050619 A1* 2/2009 Yang ........................ F24C 7/087 432/27
2010/0059509 A1* 3/2010 Imai ......................... H05B 6/68 219/690
2011/0168699 A1* 7/2011 Oomori .................. H05B 6/686 219/748
(Continued)

FOREIGN PATENT DOCUMENTS

CN 110151001 A * 8/2019
EP 2597930 5/2013
(Continued)

OTHER PUBLICATIONS

Extended European Search Report in European Appln. No. 20212722.1, dated May 31, 2021, 7 pages.
(Continued)

*Primary Examiner* — Helena Kosanovic
*Assistant Examiner* — Thao Uyen Tran-Le
(74) *Attorney, Agent, or Firm* — Fish & Richardson P.C.

(57) ABSTRACT

An oven includes a housing that defines a cooking space and that includes an upper frame defining an upper wall facing the cooking space, a heating unit disposed at the upper frame and configured to transfer heat to the cooking space, an antenna disposed at the upper frame and configured to emit, toward the cooking space, radio waves transmitted from a radio wave generator that is electrically connected to an external power source, and a forming part that protrudes upward from the upper frame and accommodates the antenna therein. The forming part covers the antenna from the cooking space.

19 Claims, 5 Drawing Sheets

(56) References Cited

U.S. PATENT DOCUMENTS

| | | | | |
|---|---|---|---|---|
| 2011/0297672 | A1* | 12/2011 | Niklasson | H05B 6/6447 219/702 |
| 2013/0027060 | A1* | 1/2013 | Tralshawala | G01N 22/04 324/642 |
| 2015/0245424 | A1* | 8/2015 | Brill | H05B 6/705 219/748 |
| 2017/0050880 | A1* | 2/2017 | Plevacova | C03C 10/0009 |
| 2017/0071036 | A1* | 3/2017 | Hunter, Jr. | H05B 6/686 |
| 2018/0270915 | A1* | 9/2018 | Koetz | H05B 6/647 |
| 2020/0205245 | A1* | 6/2020 | Ma | H05B 6/6473 |
| 2020/0205248 | A1* | 6/2020 | Zickel | H05B 6/68 |

FOREIGN PATENT DOCUMENTS

| | | | | |
|---|---|---|---|---|
| EP | 2597930 | A1 * | 5/2013 | H05B 6/642 |
| JP | H03-15190 | A | 1/1991 | |
| WO | WO-2019225413 | A1 * | 11/2019 | H05B 6/6482 |

OTHER PUBLICATIONS

Office Action in Korean Appln. No. 10-2020-0055373, mailed on Jan. 10, 2025, 12 pages (with English translation).

* cited by examiner

OVEN INCLUDING PLURAL ANTENNAS

CROSS-REFERENCE TO RELATED APPLICATION

Pursuant to 35 U.S.C. § 119(a), this application claims the benefit of the earlier filing date and the right of priority to Korean Patent Application No. 10-2020-0055373, filed on May 8, 2020, the contents of which are incorporated by reference herein in their entirety.

TECHNICAL FIELD

The present disclosure relates to an oven having an antenna installed in a forming part.

BACKGROUND

An oven is a cooking appliance that can cook food using a heat source in an enclosed environment.

For example, ovens may use microwaves, infrared radiation, convection, etc. to cook food.

A microwave oven can cook food using microwaves. In some cases, the microwave oven may have a simple structure and provide ease of use.

A microwave oven may have a space that accommodates food, and provide microwaves for heating the food therein. For instance, microwaves generated from an external power source may be transmitted into the space through a waveguide.

In some cases, the microwave oven may include an electromagnetic wave radiating device provided in the space. The microwaves introduced through the waveguide may be emitted to the space by the electromagnetic wave radiating device. The emitted microwaves may be reflected from (or bounce off) a metal inner wall that surrounds the space, and the microwaves may travel to reach the food. An antenna and the like may be used for the electromagnetic wave radiating device.

A part of the electromagnetic wave radiating device may be connected to the waveguide by a connector, and another part of the electromagnetic wave radiator may be disposed at the inner wall of the space in the oven for achieving a small size, allowing the respective parts thereof to be connected to a ground that is electrically connected to earth (ground).

In some cases, electromagnetic waves at a lower frequency band in relation to an actual length of an electromagnetic wave radiating device may be radiated through the electromagnetic wave radiating device due to the effect of the ground. If the electromagnetic wave radiating device has only one radiating portion from which electromagnetic waves are emitted, it may be implemented as a single frequency band with the maximum radiation efficiency.

Ovens are used for heating various types of food, and an optimal frequency band for heating and cooking food may vary depending on types of cooking ingredients and food.

In some cases, an oven includes a radiating portion. For instance, the oven may include an antenna having one end connected to a ground, a middle portion connected to a waveguide, and another end implemented as a radiating portion. In some cases, the radiating portion is exposed to an inside of a cooking space, the antenna may be contaminated or damaged by a cooking ingredient or food.

SUMMARY

The present disclosure describes an oven having antennas with an optimal radiation efficiency at a plurality of frequency bands.

The present disclosure also describes an oven capable of preventing or reducing contamination and damage of antennas located inside a cooking space.

The present disclosure further describes an oven capable of suppressing mutual interference between antennas having a plurality of frequency bands.

According to one aspect of the subject matter described in this application, an oven includes a housing that defines a cooking space, where the housing includes an upper frame that defines an upper wall facing the cooking space, a heating unit disposed at the upper frame and configured to transfer heat to the cooking space, an antenna disposed at the upper frame and configured to emit, toward the cooking space, radio waves transmitted from a radio wave generator that is electrically connected to an external power source, and a forming part that protrudes upward from the upper frame and accommodates the antenna therein. The forming part covers the antenna from the cooking space.

Implementations according to this aspect may include one or more of the following features. For example, the forming part can include a recessed portion that defines an accommodation space receiving the antenna, and a cover portion that is disposed at the upper frame and covers the recessed portion. In some examples, the recessed portion can be a part of the upper frame. In some examples, the recessed portion has a rectangular box shape that protrudes upward from the upper frame to define the accommodation space therein having a predetermined depth.

In some examples, an outer surface of the cover portion can define at least a portion of the upper frame. In some examples, the heating unit can be located inward to the cooking space relative to the forming part. In some examples, the heating unit can be disposed vertically below the upper wall and the forming part.

In some implementations, the antenna can include a plurality of antennas that are spaced apart from one another by a predetermined distance. In some examples, the forming part can include a plurality of forming parts that accommodate the plurality of antennas, respectively.

In some implementations, the antenna can include a feeding portion electrically connected to the external power source, a grounding portion electrically connected to a ground, and a radiating portion connected to the feeding portion and the grounding portion and configured to emit the radio waves. In some examples, the radiating portion extends along a lengthwise direction, and can include a plurality of portions that are curved or bent to define a predetermined angle with respect to the lengthwise direction.

In some examples, a cross-section of the forming part has a rectangular shape. In some examples, the antenna protrudes upward from the upper frame and is received within the forming part.

In some implementations, the cover portion can be made of an opaque material and configured to limit transmittance of the radio waves from the antenna in the recessed portion.

In some implementations, the heating unit can include a first member that extends from a rear part of the upper frame and defines an outer circumference of the heating unit, and a second member that is disposed inside of the first member and extends from the rear part of the upper frame along the first member. Each of the first member and the second member can include a plurality of portions that are curved or bent.

In some implementations, the oven can include a heating unit bracket disposed at the rear part of the upper frame, where the first member can include a first rear portion fitted into the heating unit bracket, and the second member can include a second rear portion fitted into the heating unit bracket. In some examples, the forming part and the heating unit are disposed vertically above the heating unit bracket.

In some implementations, the antenna can include a first antenna and a second antenna that extend in a first horizontal direction and are spaced apart from each other by a predetermined distance in a second horizontal direction orthogonal to the first horizontal direction. In some examples, a length of the first antenna in the first horizontal direction is different from a length of the second antenna in the first horizontal direction. For example, the length of the first antenna in the first horizontal direction can be less than the length of the second antenna in the first horizontal direction.

In some implementations, the forming part can include a first forming part that accommodates the first antenna therein, and a second forming part that accommodates the second antenna therein. The second forming part can be spaced apart from the first forming part, and a length of the first forming part in the first horizontal direction can be different from a length of the second forming part in the first horizontal direction.

In some implementations, the plurality of antennas can provide an optimal radiation efficiency at different frequency bands. In some examples, where each of the antennas is located inside a forming part, the antennas are not be exposed to a cooking space, and thus contamination and damage of the antennas can be reduce or prevented while cooking.

In some implementations, the plurality of antennas can be installed in the respective forming parts located at different positions, and interference between the antennas can be reduced or suppressed. In addition, cover portions can be respectively installed at the forming parts to cover the antennas from the cooking space, thereby improving the aesthetic appearance.

DETAILED DESCRIPTION

Figure 1:
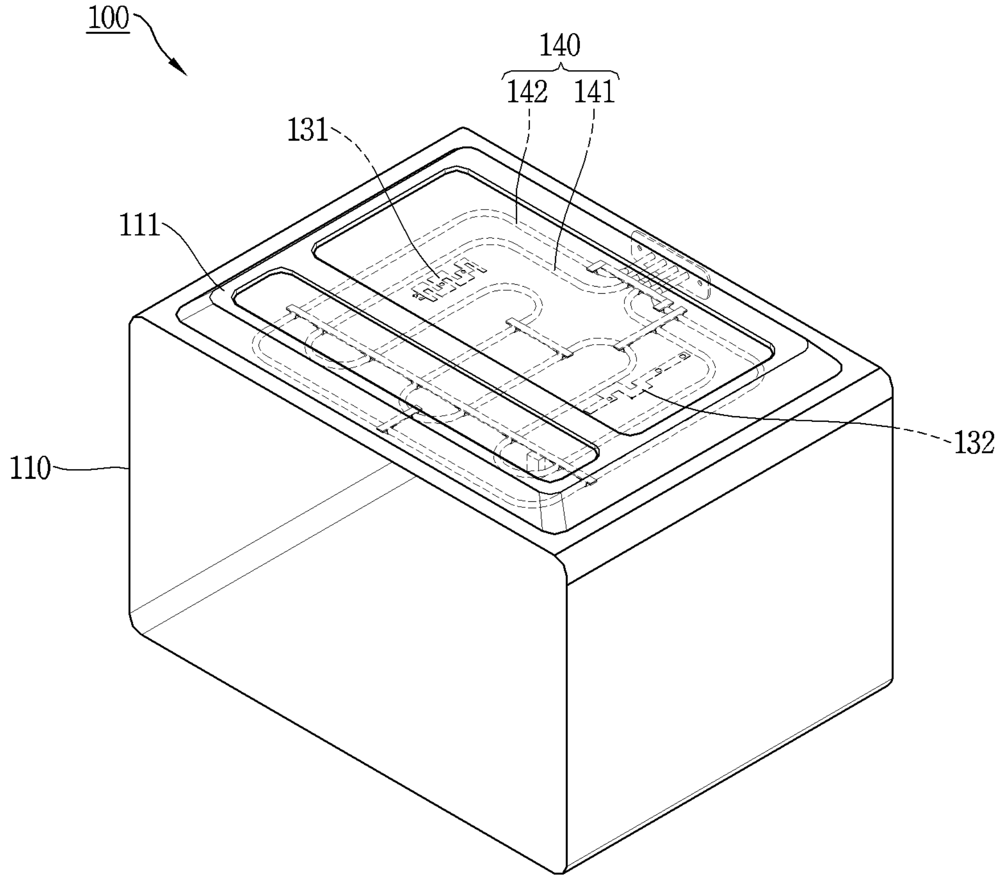
FIG. 1 is a perspective view illustrating an overall structure of an example oven.

Hereinafter, description will be given in more detail of an oven, with reference to the accompanying drawings.

In the following description, the same or similar reference numerals are given to the same or similar components in one or more implementations, and a duplicate description thereof will be omitted.

If a detailed explanation for a related known function or construction diverts the main point of the present disclosure, such explanation has been omitted but would be understood by those skilled in the art.

The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

A singular representation may include a plural representation unless it represents a definitely different meaning from the context.

Figure 2:
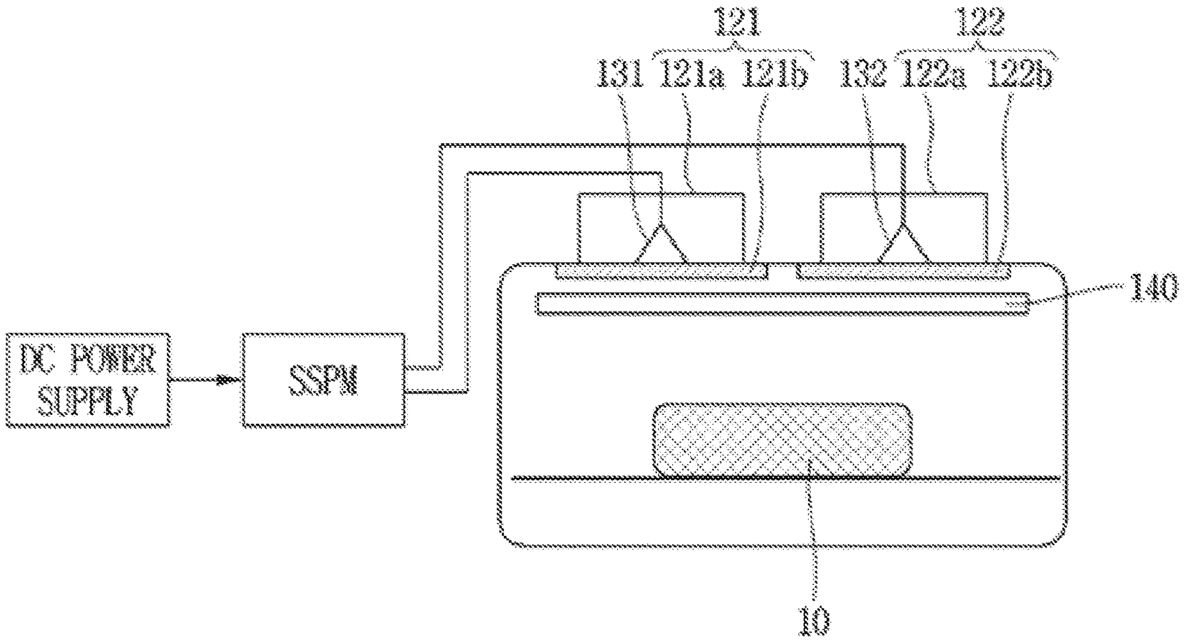
FIG. 2 is a schematic view illustrating an example of an operating principle of the oven.

FIG. 1 is a perspective view illustrating an example of an overall structure of an oven 100, and FIG. 2 is a schematic view illustrating an example of an operating principle of the oven 100.

The oven 100 refers to a cooking appliance that can accommodate food (food item or cooking ingredient) 10 in a space defined therein to heat and cook the food 10. The oven 100 may refer to a complex oven that uses an operating frequency with a cooking speed faster than other types of ovens.

The oven 100 can heat the food 10 using radio waves generated by a radio wave generator and incident on a cooking space S through an antenna 131 and an antenna 132. For example, the radio waves may refer to electromagnetic waves with frequencies ranging from 3 KHz to 106 MHz, namely the wavelength of infrared rays or greater, such as microwaves.

The oven 100 can include a housing 110 defining an outer appearance, a heating unit 140 that transfers heat to the cooking space S, and the antennas 131 and 132 that transmit radio waves to the cooking space S.

The housing 110 refers to a case defining an outer appearance, and can define the cooking space S for accommodating the food 10 to cook.

The housing 110 has a polyhedral shape with a rectangular cross section, and can accommodate and heat the food 10 therein.

For example, the cooking space S, also referred to as a cavity, can be configured to communicate with the outside when a door installed at the housing 110 is open, so as to allow the food 10 to be accommodated therein.

The housing 110 is made of an insulating material to suppress radio waves, radiated or emitted from the antennas 131 and 132, from being transmitted to an outside of the housing 110. This can help to prevent accidents such as an electric shock when a user touches the housing 110.

In addition, the housing 110 can be made of a heat-resistant material, so that damage caused by high heat generated in the cooking space S can be prevented or reduced.

The housing 110 is electrically connected to the outside. The radio wave generator accommodated in the housing 110 can be electrically connected to an external power source.

The housing 110 can include an upper frame 111 defining an upper wall inside the cooking space S.

The upper frame 111 serves to form the upper wall inside the cooking space S.

In some examples, the antennas 131 and 132 can be coupled to the upper frame 111. For example, the antennas 131 and 132 can be installed at an upper portion of the upper frame 111. Accordingly, the antennas 131 and 132 can radiate or emit radio waves from an upper side of the cooking space S.

The heating unit 140, which is configured to transmit heat to the cooking space S, can be installed at upper and lower parts of the cooking space S to heat the cooking space S. This may allow heat to be evenly transferred to the food 10 accommodated in the cooking space S.

For example, as illustrated in FIG. 1, the heating unit 140 can be fixedly installed at the upper frame 111 to be exposed toward the cooking space S. In some examples, the heating unit 140 can be fixedly installed at an inner lower portion of the housing 110 to be exposed to the cooking space S.

The heating unit 140 can have a specific (or predetermined) shape along the upper frame 111, and be formed in a specific (or predetermined) pattern.

The antennas 131 and 132 are installed inside the cooking space S to transmit radio waves generated by the radio wave generator for heating the food 10.

In some examples, the radio wave generator can be electrically connected to an external power source in a wired manner by a conducting wire member, and serve to generate radio waves to be incident on the cooking space S via a generator module.

The generator module can receive direct current (DC) power, convert the received DC power into the form of radio waves, and adjust intensity, phase, and frequency of the converted waves. For example, the generator module can include a Solid State Power Module (SSPM) having a semiconductor oscillator function.

In some implementations, as illustrated in FIG. 2, in the oven 100, power generated in a DC power supply is supplied to the SSPM, and is converted into the form of radio waves, allowing the radio waves to be transmitted to the cooking space S by the antennas 131 and 132 connected to the SSPM.

The antennas 131 and 132 are installed at one side of the upper frame 111 so as to emit radio waves, received from the radio wave generator in electrical connection to an external power source for radio wave generation, toward the cooking space S.

Intensity, phase, and frequency of radio waves generated in the radio wave generator can be adjusted, and the adjusted radio waves can be transmitted by the antennas 131 and 132.

A plurality of antennas 131 and 132 can be physically spaced apart from each other.

As the antennas 131 and 132 emit radio waves toward the cooking space S from different locations, the radio waves can be incident on the food 10 accommodated in the cooking space S from various locations, allowing the food 10 to be heated more quickly and effectively.

For example, as illustrated in FIG. 1, the antennas 131 and 132 can be implemented as a first antenna 131 and a second antenna 132 installed at different positions. The number of antennas can vary in other implementations. In some examples, where more than two antennas are provided, the antennas can be spaced apart from one another.

The antennas 131 and 132 may be spaced apart from each other. As radios waves, emitted by the antennas 131 and 132, are incident on the cooking space S from different locations, the antennas 131 and 132 may receive radio waves reflected from (or bounce off) an inside of the cooking space S.

In some implementations, a forming part 121 and a forming part 122 are provided at the upper frame 111 defining the upper wall of the cooking space S. This can help to suppress radio waves emitted from one antenna from being incident on another antenna, namely radio waves emitted from the antenna 131 may not be incident on the antenna 132, and radio waves emitted from the antenna 132 may not be incident on the antenna 131.

The forming parts 121 and 122 can protrude upward from one side of the upper frame 111 so as to accommodate the antennas 131 and 132 therein, respectively. This can help to prevent the antennas 131 and 132 from being exposed to the cooking space S. A detailed description thereof will be described hereinafter.

Figure 3:
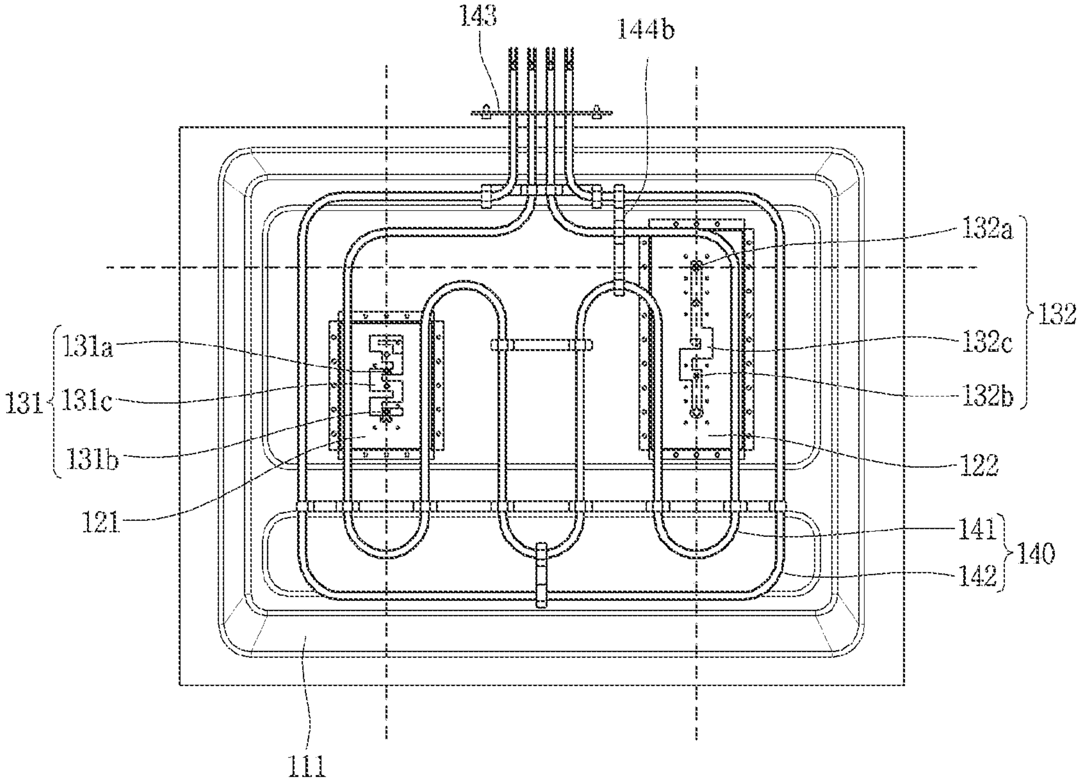
FIG. 3 is a schematic view illustrating an example of an upper part of a cooking space.
Figure 4:
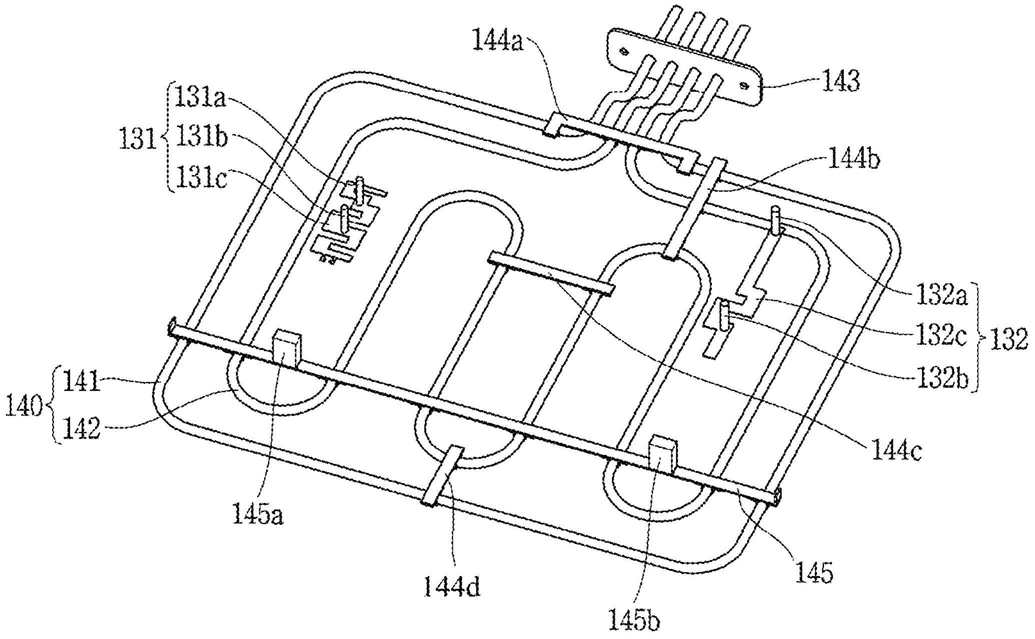
FIG. 4 is a schematic view illustrating examples of a heating unit and antennas installed inside the cooking space.

FIG. 3 is a schematic view illustrating an example of an upper part of the cooking space S. FIG. 4 is a schematic view illustrating examples of the heating unit 140, the antenna 131, and the antenna 132 installed inside the cooking space S.

The antennas 131 and 132 can be coupled and installed to the upper frame 111. Accordingly, the antennas 131 and 132 can emit radio waves to the food 10 from the upper side of the cooking space S.

The heating unit 140, configured to transfer heat to the cooking space S, can be fixed to the upper frame 111 so as to be installed inside the cooking space S.

The heating unit 140 is located inner than the forming parts 121 and 122 with respect to the cooking space S.

The heating unit 140 configured to heat the cooking space S can have a shape that allows heat to be evenly distributed throughout an entire area of the upper frame 111, so that heat is uniformly transferred to the food 10 accommodated in the cooking space S. In some cases, the heating unit 140 can include a wire or a curved bar.

The heating unit 140 can have a specific heating pattern formed by the first member 141 and the second member 142.

Each of the first member 141 and the second member 142 can form a heating pattern that ensures even load heating and heating efficiency.

The first member 141 and the second member 142 are fixed to each other at a plurality of points by fixing members 144*a*, 144*b*, 144*c*, and 144*d*. For example, each fixing member can have a bar shape or a plate shape extending in a horizontal direction.

In some examples, the first member 141 extends from a rear part of the upper frame 111 along an outer circumference, so as to form a specific (or predetermined) closed area.

In the same or other examples, the second member 142 extends from the rear part of the upper frame 111 and have a shape curved or bent at a plurality of points (or positions) at an inside of the first member 141, so as to define a specific or predetermined closed area. This shape of the second member 142 ensures uniform cooking performance while cooking the food 10.

The first member 141 and the second member 142 are configured to receive power from one end of rear portions thereof, so as to be heated by the supplied power to release or emit heat.

The first member 141 and the second member 142 can be configured such that the rear portions thereof are fixed by a heating unit bracket 143. The heating unit bracket 143 can be fixed to a rear portion of the housing 110.

In addition, the plurality of antennas 131 and 132 can be installed at the upper frame 111 defining the upper wall of the cooking space S.

In some implementations, as illustrated in FIG. 3, each of the antennas 131 and 132 can be located inside the closed area formed by the heating unit 140.

The antennas 131 and 132 can be configured as the first antenna 131 and the second antenna 132 that are installed at different locations to be spaced apart from each other by a predetermined distance.

The antennas 131 and 132 are located at the respective forming parts 121 and 122 provided at the upper frame 111. This can help to suppress radio waves emitted from one antenna from being incident on another antenna, namely radio waves emitted from the antenna 131 may not be incident on the antenna 132, and vice versa.

The forming parts 121 and 122 can be implemented as a first forming part 121 in which the first antenna 131 is located, and a second forming part 122 in which the second antenna 132 is located.

The antennas 131 and 132 allow radio waves generated and adjusted in the generator module configured as the SSPM to be incident toward the cooking space S.

The antenna 131 and the antenna 132 can respectively include a feeding portion 131*a* and a feeding portion 132*a* connected to the radio wave generator, a grounding portion 131*b* and a grounding portion 132*b* connected to a ground, and a radiating portion 131*c* and a radiating portion 132*c*.

The feeding portions 131*a* and 132*a* can be implemented as a connector configured to transmit radio waves generated in the radio wave generator.

The feeding portions 131*a* and 132*a* can have a cylindrical shape extending in a vertical (or up-and-down) direction.

An electrical connection member coupled to a waveguide extending from the radio wave generator can be provided in each of a hollow body of the feeding portions 131*a* and 132*a*. The electrical connection member can be made of a copper or brass material.

The grounding portions 131*b* and 132*b* connected to the ground can be formed in a cylindrical shape extending in the vertical direction. As the grounding portions 131*b* and 132*b* of the antennas 131 and 132 are connected to the ground, radio waves at a low frequency band can be efficiently radiated. Accordingly, radio waves with a relatively low frequency range can be emitted in a manner of optimal efficiency, achieving a small size of the antennas 131 and 132.

In addition, when the antennas 131 and 132 are implemented as the first antenna 131 and the second antenna 132, each of the grounding portions 131*b* and 132*b* is electrically connected to the ground.

An electrical connection member coupled to a ground terminal can be provided in a hollow body of the grounding portions 131*b* and 132*b*. The electrical connection member can be made of a copper or brass material.

A vertically extended length of the feeding portions 131*a* and 132*a* can be less (or shorter) than a vertically extended length of the grounding portions 131*b* and 132*b*.

The radiating portions 131*c* and 132*c* are configured to emit radio waves by connecting the respective feeding portions 131*a* and 132*a* and the respective grounding portions 131*b* and 132*b*. Each of the radiating portions 131*c* and 132*c* has a shape that is vertically longer than horizontally wide, and is made of a material having excellent electrical conductivity. For example, the radiating portions 131*c* and 132*c* can be made of any one of aluminum (Al), gold (Au), silver (Ag), and copper (Cu).

A total length of the radiating portions 131*c* and 132*c* can vary depending on a frequency of radio wave radiated, and when radio waves in a frequency band that does not match a total length of the radiating portions 131*c* and/or 132*c* are emitted therethrough, radiation efficiency can be reduced. In some examples, the total lengths of the radiating portions 131*c* and 132*c* can be determined according to shapes extended and curved or bent between the grounding portion 131*b* and the feeding portion 131*a*, and between the grounding portion 132*b* and the feeding portion 132*a*, respectively.

Figure 5:
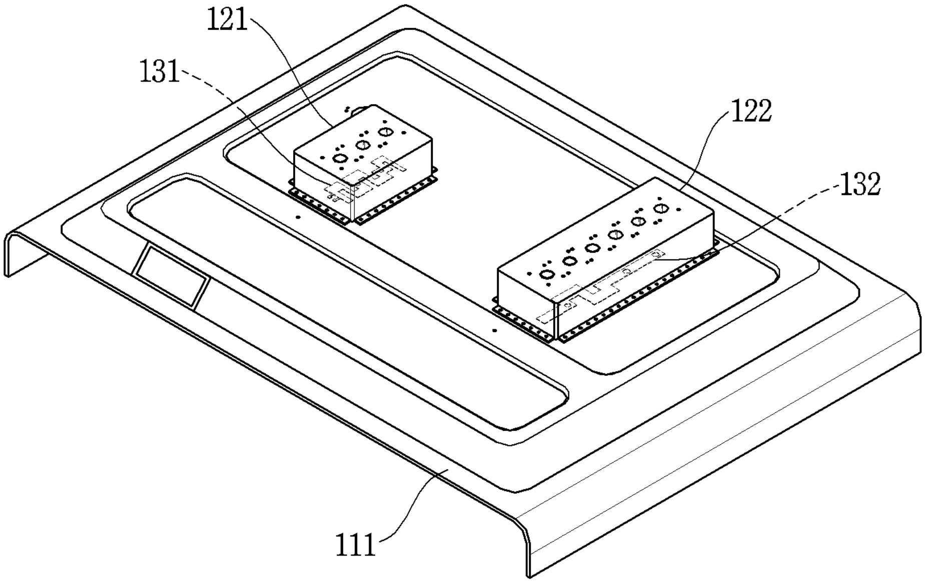
FIG. 5 is a perspective view of an example of an upper frame.
Figure 6:
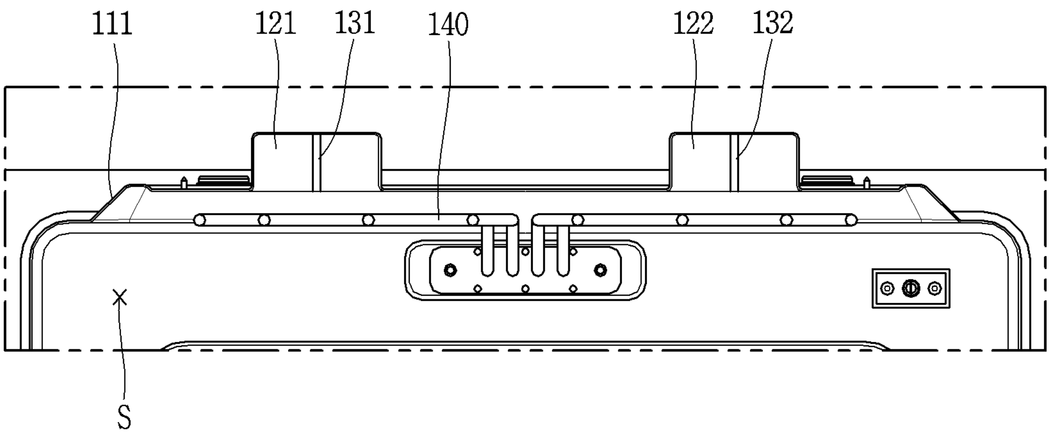
FIG. 6 is a cross-sectional view illustrating an example of an inside of the upper frame.

FIG. 5 is a perspective view of an example of the upper frame 111, and FIG. 6 is a cross-sectional view of an example of the upper frame 111.

The antennas 131 and 132 can be installed at the upper frame 111 located inside the cooking space S. Accordingly, the antennas 131 and 132 can emit radio waves from the upper side of the cooking space S, so as to allow the food 10 to be cooked.

In some cases, where the antennas 131 and 132 are installed at the upper part of the cooking space S, contamination and damage to the antennas 131 and 132 may occur due to high heat generated by the heating unit 140 installed adjacent to the antennas 131 and 132, and the food 10 heated and cooked in the cooking space S.

In order to prevent or reduce contamination and damage to the antennas 131 and 132, in some implementations, the oven 100 can include the forming parts 121 and 122 that are provided at one side of the upper frame 111 and that accommodate the antennas 131 and 132 therein, respectively. For example, the forming parts 121 and 122 can be protrusions that protrude from an upper surface of the upper frame 111.

In some implementations, the forming parts 121 and 122 protrude upward from the one side of the upper frame 111. As the antennas 131 and 132 are accommodated in the forming parts 121 and 122, the antennas 131 and 132 may not be exposed to the cooking space S.

The forming parts 121 and 122 can respectively include a recessed portion 121*a* and a recessed portion 122*a*, and a covering portion 121*b* and a covering portion 122*b*.

The recessed portions 121*a* and 122*a* are recessed upward to form a specific accommodation space, so as to allow the antennas 131 and 132 to be located at the one side of the upper frame 111.

The recessed portions 121*a* and 122*a* can be integrally formed with the upper frame 111, and be recessed in a rectangular shape to have a predetermined depth.

For example, the depth of the recessed portions 121*a* and 122*a* can be approximately λ/9 to λ/10. Here, "λ" denotes a wavelength value obtained through frequencies emitted by the antennas 131 and 132, and the recessed portions 121*a* and 122*a* can have a depth of approximately 30 to 40 mm at a frequency of 915 MHz.

In addition, a length of the recessed portions 121*a* and 122*a* can be approximately λ/2 such that emission of the antennas 131 and 132 is smoothly performed, and a left and right (or horizontal) width of the recessed portions 121*a* and 122*a* can be approximately 10 mm or more such that at least a part of the heating unit 140 vertically overlaps the recessed portions 121*a* and 122*a*.

Likewise, "λ" denotes a wavelength value obtained through frequencies radiated by the antennas 131 and 132.

In some implementations, the recessed portions 121*a* and 122*a* extend upward or are recessed upward from the cooking space S to form the specific accommodation space, so as to allow the antennas 131 and 132 to be installed at the recessed portions 121*a* and 122*a*.

In some examples, where the antennas 131 and 132 are located in the accommodation space of the recessed portions 121*a* and 122*a*, the antennas 131 and 132 may not protrude to the cooking space S.

The cover portions 121*b* and 122*b* can have a specific or predetermined metal plate shape, and be installed to cover the recessed portions 121*a* and 122*a*, respectively. The cover portions 121*b* and 122*b* can have the shape that corresponds to the shape of the recessed portions 121*a* and 122*a*.

The cover portions 121*b* and 122*b* serve to limit external exposure of the antennas 131 and 132 located in the accommodation space of the recessed portions 121*a* and 122*a*. The cover portions 121*b* and 122*b* can be fixedly installed at a bottom portion of the upper frame 111 so as to cover the recessed portions 121*a* and 122*a*.

In some implementations, the cover portions 121*b* and 122*b* are installed at the upper frame 111 in a manner of not protruding toward the cooking space S, so that outer surfaces of the cover portions 121*b* and 122*b* disposed toward the cooking space S can form the same plane as the upper frame 111.

In addition, the cover portions 121*b* and 122*b* can be made of an opaque material so as to limit or restrict transmittance of the antennas 131 and 132 accommodated in the recessed portions 121*a* and 122*a*. This can help to prevent the antennas 131 and 132 accommodated in the respective forming parts 121 and 122 from protruding to the cooking space S, and to achieve an oven structure with a sense of unity, where the antennas 131 and 132 are invisible or covered owing to opacity of the cover portions 121*b* and 122*b*.

Further, the plurality of the forming parts 121 and 122 can be provided to accommodate the antennas 131 and 132 therein, respectively.

For example, each of the forming parts 121 and 122 can define the accommodation space therein that is recessed upward from the cooking space S in a manner of corresponding to the overall shape of the antennas 131 and 132, so as to receive the respective antennas 131 and 132 therein. As the antennas 131 and 132 are located at the respective forming parts 121 and 122, the antennas 131 and 132 may not protrude toward the inside of the cooking space S. In addition, as a separate wall is formed between the antennas 131 and 132 by the forming parts 121 and 122, mutual interference between the antennas 131 and 132 can be prevented or reduced. For example, when the antennas 131 and 132 protrude toward the cooking space S, a mutual coupling between the antenna 131 and the antenna 132 can be −2 to −3 dB, whereas when the antennas 131 and 132 are located at the respective forming parts 121 and 122, the mutual coupling between the antenna 131 and the antenna 132 can be reduced by −6 to −8 dB.

In some implementations, the oven 100 can include a support member 145 that is coupled to the heating unit 140 and extends across the heating unit 140.

In some examples, the support member 145 can include mounting portions 145*a* and 145*b* installed on or extended from the support member 145 to the upper frame 111. For example, the mounting portions 145*a* and 145*b* can be installed at a plurality of positions of the support member 145. For example, the mounting portions 145*a* and 145*b* can be installed at positions that do not overlap the first member 141 and the second member 142.

In some examples, the mounting portions 145*a* and 145*b* can be disposed inward of the first member 141, and at least a portion of the second member 142 can be disposed between the mounting portions 145*a* and 145*b*. In some cases, each of the mounting portions 145*a* and 145*b* can be disposed between adjacent straight portions of the second member 142. In some cases, each of the mounting portions 145*a* and 145*b* can be disposed between a straight portion of the first member 141 and a straight portion of the second member 142 adjacent and facing the straight portion of the first member 141.

The foregoing implementations are merely illustrative to practice the oven. Therefore, the present disclosure is not limited to the above-described implementations, and it will be understood by those of ordinary skill in the art that various changes in form and details may be made therein without departing from the scope of the present disclosure.

What is claimed is:

1. An oven comprising:

a housing that defines a cooking space and an outer appearance of the oven, the housing comprising an upper frame that defines an upper wall facing the cooking space;

a heating unit disposed below the upper frame in a vertical direction and configured to transfer heat to the cooking space;

an antenna disposed at the upper frame and configured to emit, toward the cooking space, radio waves transmitted from a radio wave generator that is electrically connected to an external power source; and a forming part that protrudes outward from the upper frame to an outside of the housing to thereby accommodate the antenna therein, the forming part covering the antenna from the cooking space, wherein the antenna comprises a plurality of antennas that are spaced apart from one another by a predetermined distance, wherein the forming part comprises a plurality of forming parts that accommodate the plurality of antennas, respectively, wherein the heating unit comprises:

a first member that extends from a rear part of the upper frame and defines an outer circumference of the heating unit, and a second member that is disposed inside of the first member and extends from the rear part of the upper frame along the first member, wherein the second member comprises:

a plurality of straight portions that extend in a first horizontal direction and are spaced apart from one another in a second horizontal direction orthogonal to the first horizontal direction, and a plurality of curved portions that are spaced apart from one another in the second horizontal direction and connect ends of two adjacent straight portions of the plurality of straight portions to each other, wherein the plurality of straight portions comprise (i) a pair of central straight portions that face the rear part of the upper frame, (ii) a pair of left straight portions disposed at a left side of the pair of central straight portions, and (iii) a pair of right straight portions disposed at a right side of the pair of central straight portions, and wherein the plurality of antennas comprise (i) a first antenna disposed between the pair of left straight portions and (ii) a second antenna disposed between the pair of right straight portions such that the first and second antennas do not overlap with the heating unit along the vertical direction.

2. The oven of claim 1, wherein the forming part comprises:

a recessed portion that defines an accommodation space receiving the antenna; and a cover portion that is disposed at the upper frame and covers the recessed portion.

3. The oven of claim 2, wherein the recessed portion is a part of the upper frame.

4. The oven of claim 3, wherein the recessed portion has a rectangular box shape that protrudes upward from the upper frame to define the accommodation space therein having a predetermined depth.

5. The oven of claim 2, wherein an outer surface of the cover portion defines at least a portion of the upper frame.

6. The oven of claim 5, wherein the cover portion is made of an opaque material and configured to limit transmittance of the radio waves from the antenna in the recessed portion.

7. The oven of claim 1, wherein the heating unit is located inward to the cooking space relative to the forming part.

8. The oven of claim 1, wherein the antenna comprises:

a feeding portion electrically connected to the external power source;

a grounding portion electrically connected to a ground; and a radiating portion connected to the feeding portion and the grounding portion and configured to emit the radio waves.

9. The oven of claim 8, wherein the radiating portion extends along a lengthwise direction, and comprises a plurality of portions that are curved or bent to define a predetermined angle with respect to the lengthwise direction.

10. The oven of claim 1, wherein a cross-section of the forming part has a rectangular shape.

11. The oven of claim 1, wherein the heating unit is disposed vertically below the upper wall and the forming part.

12. The oven of claim 1, wherein the antenna protrudes upward from the upper frame and is received within the forming part.

13. The oven of claim 1, further comprising a heating unit bracket disposed at the rear part of the upper frame, wherein the first member comprises a first rear portion fitted into the heating unit bracket, and the second member comprises a second rear portion fitted into the heating unit bracket.

14. The oven of claim 13, wherein the forming part and the heating unit are disposed vertically above the heating unit bracket.

15. The oven of claim 1, wherein the first antenna and the second antenna extend in the first horizontal direction and are spaced apart from each other by the predetermined distance in the second horizontal direction.

16. The oven of claim 15, wherein a length of the first antenna in the first horizontal direction is different from a length of the second antenna in the first horizontal direction.

17. The oven of claim 15, wherein the plurality of forming parts comprise a first forming part that accommodates the first antenna therein, and a second forming part that accommodates the second antenna therein, the second forming part being spaced apart from the first forming part, and wherein a length of the first forming part in the first horizontal direction is different from a length of the second forming part in the first horizontal direction.

18. The oven of claim 1, further comprising a plurality of fixing members that couple the first member and the second member to each other and that couple parts of the second member to each other, wherein at least one of the plurality of fixing members extends in the second horizontal direction and connects between the pair of central straight portions.

19. The oven of claim 18, wherein the first antenna is disposed at the left side of the at least one of the plurality of fixing members, and wherein the second antenna is disposed at the right side of the at least one of the plurality of fixing members.

* * * * *